E. WIEDINGER.
WEIGHER.
APPLICATION FILED APR. 14, 1917.
1,300,313.
Patented Apr. 15, 1919.
4 SHEETS—SHEET 1.
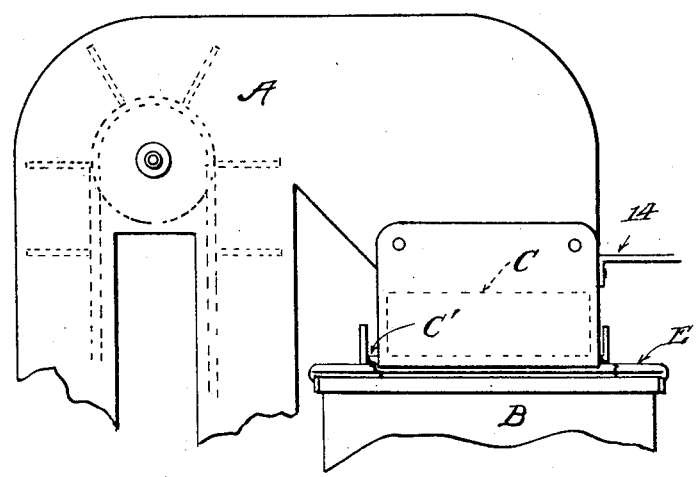
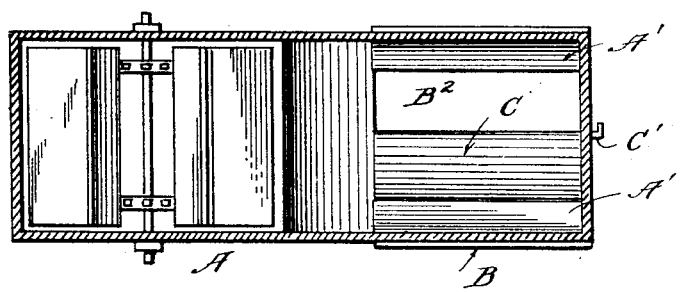
Witnesses:
Inventor:
Edward Wiedinger,

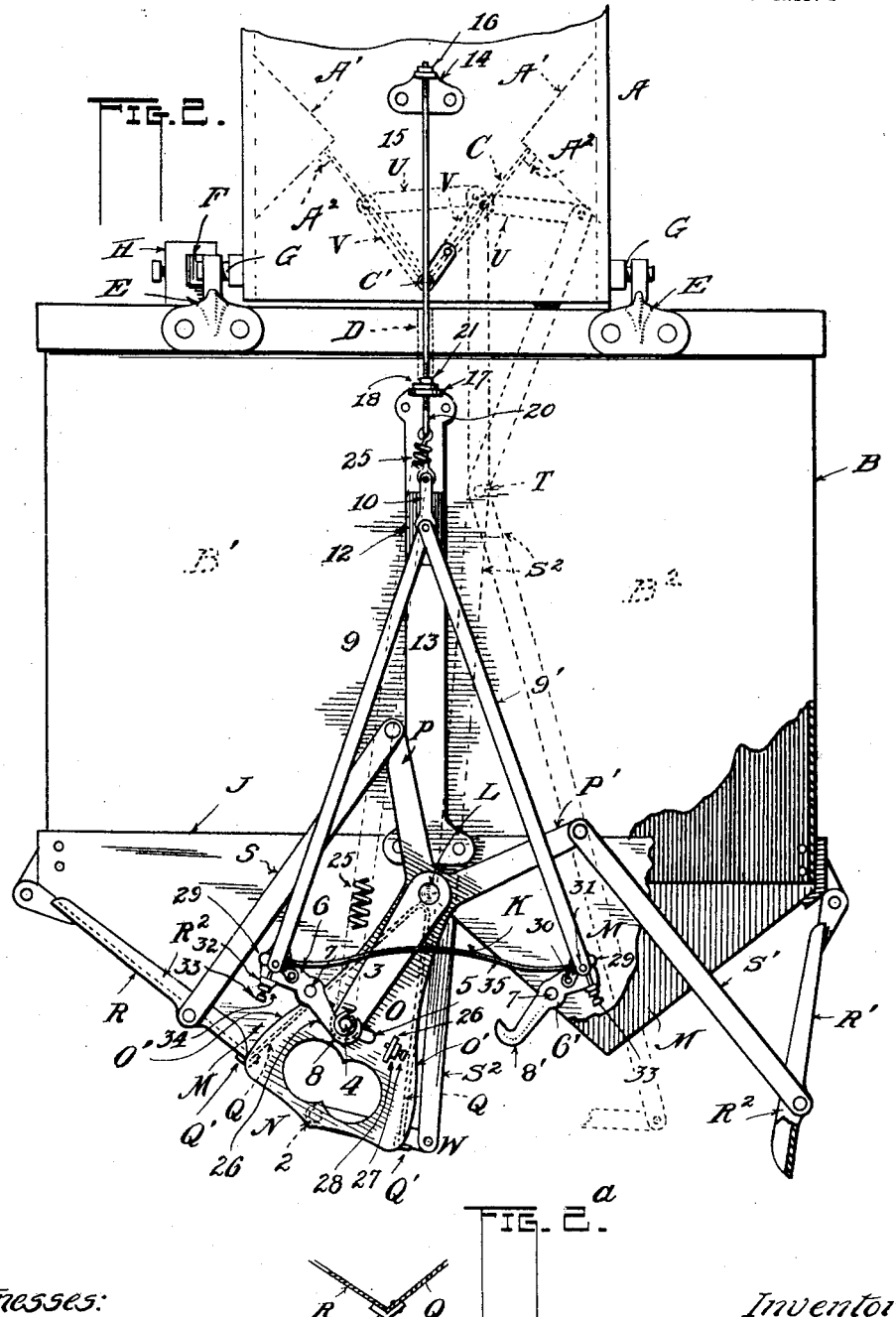

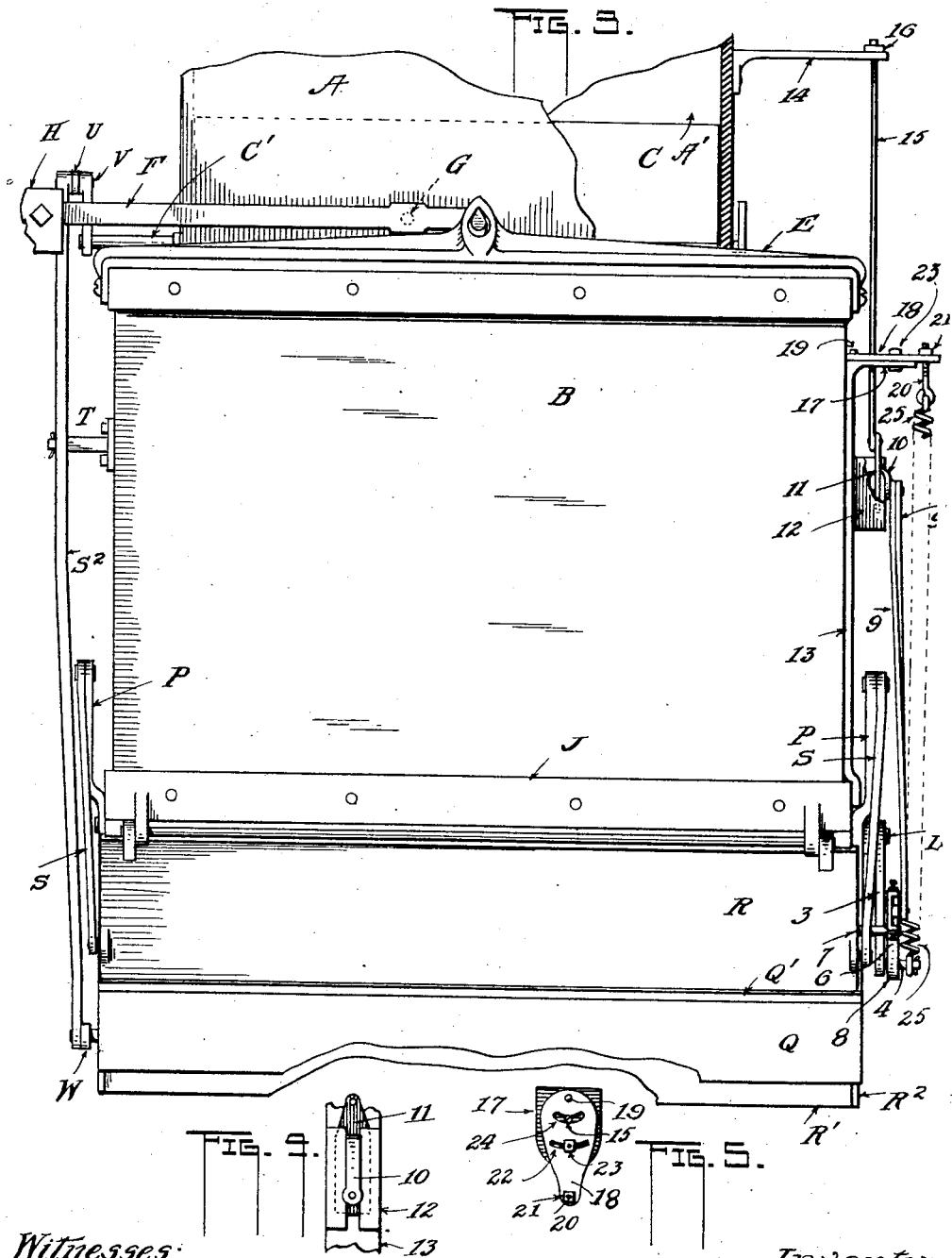

E. WIEDINGER.
WEIGHER.
APPLICATION FILED APR. 14, 1917.
1,300,313. Patented Apr. 15, 1919.
4 SHEETS—SHEET 4.
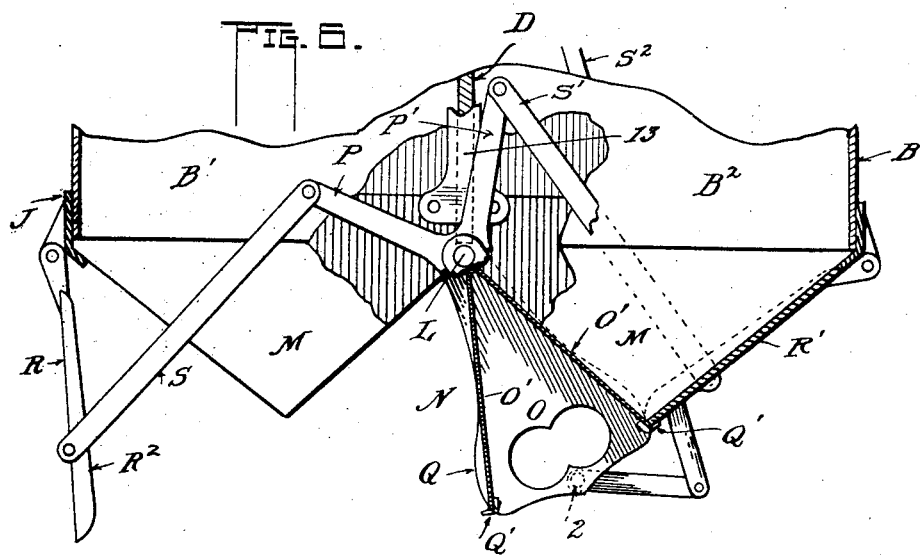
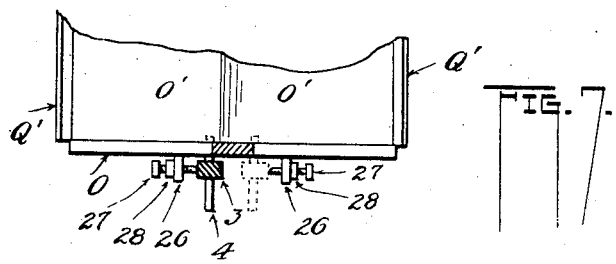
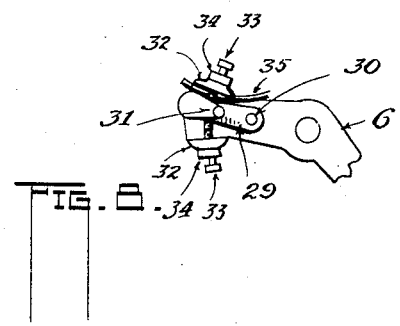
Witnesses:
Inventor:
Edward Wiedinger,

UNITED STATES PATENT OFFICE.

EDWUARD WIEDINGER, OF PEORIA, ILLINOIS.

WEIGHER.

1,300,313.  Specification of Letters Patent.  Patented Apr. 15, 1919.

Application filed April 14, 1917.   Serial No. 162,016.

*To all whom it may concern:*

Be it known that I, EDWUARD WIEDINGER, citizen of the United States, residing at Peoria, in the county of Peoria and State of Illinois, have invented certain new and useful Improvements in Weighers; and I do hereby declare that the following is a full, clear, and exact description of the invention, which will enable others skilled in the art to which it appertains to make and use the same.

This invention relates to grain weighers of a type suitable for use on separators or in other places where grain is to be measured.

One of the objects of the invention is to so dispose the part from which the grain is delivered to a weigher, with reference to the cut-off valve for directing the grain into the weighing hopper, that the cast of the grain upon said valve will not act to retard the action of that member in one direction of its movement more than the other.

Another object is to so dispose the elevator and its head with respect to the cut-off valve for the weighing hopper that the weight of grain discharged upon or against said valve will be practically identical in either of the positions of the latter so as not to affect the action of the weigher in any way to cause unequal weighing.

Another object is to dispose the cut-off valve between an elevator-head and a weighing hopper in such a position that the direction of its movement from one extreme position to the other will be in a plane substantially at right angles to or perpendicular to the plane of the elevator and its head and perpendicular to the direction of movement of the discharged grain.

Another object is to construct a weigher the compartments of whose receiving hopper or receptacle will have the widest possible opening for the discharge of the grain so that the delivery will be practically instantaneous, removing thereby any chance of a retarding action in the movement of the weigher parts.

Another object is to provide, in a weighing hopper, a central oscillating valve, gate or closure, and a valve or closure pivoted at the outer side of the receptacle, which valves or closures will act together to open the compartments of said hopper to their widest limits when delivering the grain.

Still another object is to provide a weighing receptacle wherein the entire bottom of each of its compartments will be opened to its widest limits in the delivery of the grain.

Still another object is to provide various adjustments for the parts of a weigher whereby said weigher can be made to accurately weigh from either of its two compartments, and for causing one compartment to weigh equally with the other.

Besides the above objects the invention relates to various novel features of construction in a weigher as will be brought out in the following specification and drawings, the latter showing one embodiment of my invention, it being understood that such changes may be made in the structure as will lie within the meaning of the invention and fall within the scope of the claims.

Figure 1 is a side elevation of an elevator and my improved weigher suspended from its head.

Fig. 1ᵃ is a plan of the same.

Fig. 2 is a front elevation of the weigher on a much larger scale.

Fig. 2ᵃ is a vertical section of portions of two valves, showing the relation of their edges one to the other.

Fig. 3 is a side elevation of the weigher.

Fig. 4 is an elevation of a guiding portion for certain parts of the invention.

Fig. 5 is a plan of a part for adjusting one of the portions of the mechanism.

Fig. 6 is an elevation in part section of portions of the front of the weigher.

Fig. 7 is a plan of a portion of a valve; and,

Fig. 8 is an elevation of a part of a latch, showing certain adjustable portions.

A illustrates the elevator and its head and B a weighing hopper suspended from the latter. C indicates a valve in the elevator-head adapted for two positions, the pivot for said valve lying parallel to and above a dividing partition D in the said weighing hopper. As distinguished from devices of this nature, wherein a valve is employed to direct the grain from an elevator or other discharge member into either of two compartments of a weighing hopper, the said valve C swings in a direction substantially at right angles to, or perpendicular to the plane in which the elevator and its head lie, and perpendicular to the direction in which the grain is discharged, the description of the advantage of which will be left until later herein.

The valve is carried by a shaft C′ suitably journaled in the head and swings to two opposite positions and preferably in each of those positions the valve lies beneath an overhanging portion A', Fig. 2, and against any suitable stop A² for example. Either of the portions A' and the valve serve to direct the grain into either compartment B' B² of the weighing hopper B, the latter, of course, being suspended from any suitable part. For convenience, in the present case, it is attached to the elevator-head by means of bails E and any usual scale-beam F is employed and may be pivoted to said elevator-head at G, said scale-beam being provided with a poise H, all of which is too well understood to require further description herein.

The weighing hopper is preferably constructed of sheet metal and in the present instance is square or rectangular in form as viewed in plan. Attached to its lower portion is a frame J which at its opposite sides, or what may be termed the back and front, is furnished with an A-shaped recess K, which lies beneath the central partition D, there being a shaft L journaled in the frame below the partition and at the point of the recess, as clearly shown in Fig. 6.

The portions of the frame having the recesses K are beveled from the outer sides downward and inward toward the recess, the said bevels and the said recesses thereby creating the depending V-shaped extensions M. N indicates, as a whole, an A-shaped valve made up of end portions O which lie parallel to the recessed ends of the frame just mentioned, said end portions terminating at their upper ends in a pair of divergent arms P, P', both end structures being carried by and secured rigidly to the described shaft L, the arms P, P' lying above said shaft. Secured between the described end portions O are two divergent walls Q in form of an A, each of which acts as a closure for the bottom of one of the compartments B' B² as will be understood presently.

The said walls Q extend the full width of the weighing hopper and their ends are adapted to lie against the edges of the depending portions M within the described recess K. Pivotally suspended at opposite sides of the weighing hopper are the valves or closures R R', each of which is adapted to lie against the beveled edges of the frame extensions M.

The valves or closures R R' are provided at their ends with flanges R² to overlie the outer surfaces of the frame J and the edges of the ends O of the valve N are likewise provided with flanges O', also to overlie the edges of said frame within the recess K. Furthermore, a flange Q' extends outward from and along the parts Q so as to overlie the edges of said valves or closures R, R' as clearly shown in Figs. 2, 2ª and 6. By the structure described the leakage of grain from either compartment of the hopper is absolutely prevented since the several flanges will close all possible avenues of escape, even for such material as flax-seed.

S S' indicate two links, each of which is connected at one end to one of the described valves R R' and at its other end to one of the arms P P'. S² is a lever pivoted at T upon the weighing hopper, its upper end being connected by means of a link U, for example, to an arm V secured to the shaft C' of the valve C in the elevator-head.

The lower end of the lever is connected by a link W for example with the middle of the valve N at 2. 3 is a depending arm mounted on the shaft L and free to swing with relation thereto and lies adjacent one of the ends O of said valve N. It is provided with a pin 4 which extends outward and which may likewise extend inward through a slot 5 in the end O, said slot being described from the axis of the shaft L. 6 6' represent two arms of a trip mechanism now to be described, each arm being mounted between its ends upon a stud 7 extending from one of the portions M of the frame J. Each arm 6 6' is provided at one end with an upwardly extended hook 8 8' adapted for engaging the said pin 4 of the arm 3. To the opposite end of each arm is suitably pivoted a rod 9 9', the opposite ends of the rods being attached at a common point to a vertically movable arm 10 of a plate 11 slidable within a guide 12 secured on the side of the weighing hopper and may be a part of a bar 13 secured on the latter.

Upon the elevator-head, or some other suitable support, is a bracket 14 from which extends and through which depends a rod 15 having a connection with the described plate 11. 16 is a nut for longitudinal adjustment of the rod 15 and to limit its downward movement. 17 is an outwardly extending bracket on the side of the weighing hopper. 18 is a plate pivoted at 19 to said bracket and 20 is an eye-bolt suspended from said plate and adjustable therein vertically by means of a nut 21, for example.

22 is a slot in said plate 18 through which a bolt 23 extends providing means for adjusting the plate in a lateral direction on its pivot. 24 is a slot through which the described rod 15 extends, the said slot being provided in order that the plate may swing laterally without respect to said rod. A contractile spring 25 is attached at one end to the eye-bolt 20 and its other end engages the pin 4 of the arm 3. 26 is a pair of spaced lugs extending from one of the ends O, Figs. 2 and 7. Each carries a set-screw 27, 28 being a lock-nut for securing the set screw in a desired adjustment. The arm 3 extends between the lugs and the said set-screws are adapted to receive it as it swings relatively to the valve N.

Each arm 6, 6' at its end to which the rods 9, 9' are attached has pivoted to it at 30 a member 29. 31 is a pin extending from each said member to receive its respective rod. 32 are spaced lugs through which screws 33 extend, 34 being lock-nuts for the same. The adjustment of the set-screws 33, as may be understood, will change the positions of the hooked ends of the arms from the fact that the rods 9, 9' are of fixed length and are limited in their downward movement by the nut 16 at the bracket 14, and in the movement of said set-screws causing the hooks L to be raised or lowered as may be required and as will appear later.

The operation is as follows:—

Grain will be delivered into the compartment B', Fig. 2, until an amount has been received sufficient to overcome the weight of the poise H whereupon the hopper will descend. In its descent the stud 7 carrying the arm 6 in moving downwardly causes the hook 8 to be withdrawn from beneath the pin 4. This is by reason of the fact that the rod 9 cannot descend since it is prevented doing so by the rod 15 and nut 16.

The arm 3 which in the position shown has been held against one of the set-screws 27, and thereby in turn has held the valve N closed, is now released as is also the valve or closure R which has been held closed due to the position of the arm P with which it is connected through the link S. The weight of the grain upon the valves N and R now forces them open whereupon they take the positions shown in Fig. 6, the compartment B' being opened to its full width, the bulk of grain dropping in a mass without in the least bearing upon or having a retarding action upon any part of the hopper such as would prevent the hopper from instantly rising to its receiving position through the poise H.

The relation of the lever arms and other parts is such that the valve N will withdraw its flange Q' from beneath the valve or closure R before the latter moves so that said flange will not tend to prevent instant separation of said valves.

At this time it is desired to lay particular stress upon the fact that the ability to quickly open the closures and expose the full area of the compartment of a weighing hopper to quickly drop the bulk of grain is of advantage. It is believed to be new, in a weigher, to supply valves or closures which operate together to close the entire area of each compartment. Pivoting one of the closures at the outer wall of the hopper and one beneath the dividing partition D accomplishes this purpose. To quickly dispose of the load so that it will not retard the movement of the weigher is a very important gain.

As the set-screw against which the arm 3 has been lying is carried with the valve N to the opposite position said arm is moved with the latter until its pin 4, after passing a vertical line dropped from the axis of the shaft L, is acted on by the spring 25, which is always under tension. Said spring now pulls said arm 3 after the pin 4 has passed over center, against the opposite set screw, finishing the swing of the valve N, suddenly carrying it with force to the closed position. The valve R' also moves to close the compartment B², the pin 4 being then received by the hook 8' of the arm 6' at that side.

The spring 25 is under constant tension and said tension may be varied by means of the nut 21 of the eye-bolt 20 referred to. With this pull of the spring the arm 3 cannot remain on center, that is to say, with the line of pull of the spring passing through the point of attachment thereof at the eye-bolt 20, the shaft L and said pin 4, the impetus given the valve N by the grain carries the latter past the line of pull, the spring finishing the movement. The spring carries the arm against the set-screw 27 opposite that against with which it had contact when the parts were in the position shown in Fig. 2, and, if, for any reason, an obstruction should momentarily prevent the valves closing the spring will complete the closing movement.

In moving to the position shown in Fig. 6, the valve R' reaches the closed position just before the valve N so that the flange Q' of the latter will overlie it as in the first position described, it being understood, however, that the closing movement is instantaneous. In this movement of the valves to open one compartment and close the other the lever S² operates to move the valve C in the elevator-head to the opposite position so that the grain must now be delivered into the compartment just closed.

The hooks 8 are adapted to yield downwardly from their normal pin-engaging positions. That is to say, a spring 35 may be used which in this instance engages at its ends each of the arms 6 6' at their ends remote from their said hooks 8, the form of the spring being such as to maintain a downward pressure upon said arms to hold the hooks elastically. Other forms and adaptations of spring may, of course, be employed to obtain the desired aims. As the pin 4 swings with the arm 3 it meets the hook and forces it downward whereupon after passing over the end of the hook the spring lifts said hook so that it then positively engages and holds said pin.

In depressing the hooks the rods 9, 9' are lifted slightly the plate 11 moving upward within the guide 12, the latter serving to hold the rods in their proper positions. The adjustment of the set-screws 33 of the arms 6 6' admits of locating the hooks in the proper positions in the path of the pin. The latter, as already described, may extend through the slot 5 in the valve N, and the slot may limit the swing of the arm 3 relatively to the valve so that I may employ the slot or the set-screws 27, or both, the latter being preferable, however, from the fact that by their movement the valves may be nicely adjusted upon the extensions M to prevent the leakage of grain. If, however, a set screw is lost during operation the pin 4 will engage the ends of the slot in the valve N and the parts will function until a new screw is supplied.

As shown in Fig. 2, when the pin 4 is in engagement with the hook 8 the set-screw 27 at that side upon being tightened against the arm 3 must naturally force the valve N to the left so that its portion Q will be made to tightly fit against the edges of the said extensions M and since the arm P is connected with the closed valve R through the link S said valve R will in turn be brought up snugly to its place in the same way, but this does not affect the releasing of the pin 4, since the pivot for the arm 6 is somewhat higher than said pin and the arcuate movement of the hook carries it downwardly and outwardly away from the pin and readily releases it.

The adjustment of the set screws 27 also provides for adjusting the parts for causing the hopper to weigh out an identical amount of grain from each of its compartments. That is to say, if one of the hooks engages the pin 4 with too great friction the descent of the hopper may be retarded in weighing from the compartment corresponding to said hook. A greater weight of grain would be required at that side, therefore, to start the hopper down to release the hook. Having set the poise of the scale-beam to the required number of pounds per bushel the hooks are adjusted so that this predetermined weight taken on by the hopper will be released. This test is made for each compartment, both the hooks being adjusted accordingly, through the set-screws 27 so that the pin 4 will pass off each hook at exactly the same weight.

The nut 16 controlling the rod 15 is turned to give the rought adjustment for the hooks 8 8' and the delicate adjustment in different machines for proper weights is gotten through the described set-screws 33.

In order that the spring 25 may have equal opportunity to carry the arm 3 over center in either direction, its line of pull is properly located by moving the plate 18 laterally. By this means the pull of the spring will be identical in either direction of operation. In setting up the machine if there is a sluggish operation in one direction the shifting of the plate in the proper direction to change the line of pull of the spring will remedy the evil. It is, therefore, seen that the various adjustments provide for accurately weighing from both the compartments aided by the very important disposal of the valve C, with reference to the direction from which the grain is delivered upon it from the elevator, to make the weigher absolutely accurate in operation and in results obtained.

In further considering the position of the said valve C in the elevator-head it is to be noted that the grain discharged from the elevator is thrown upon the valve from a direction that will not affect the operation of the valve in one direction more than another.

In most devices the grain is delivered upon or against the valve from a direction at right angles to the axis of movement of the valve so that in swinging from one of its positions to the other the grain is cast squarely against the valve. That is to say, in one direction of its movement the valve must be lifted directly against the oncoming grain, while in the other direction of movement the cast of grain against the valve speeds its movement in that direction. Consequently, the valve requires more power for its operation in one direction than the other and its movement is thus retarded in that direction of throw. When such a valve is connected with the operating part of a weighing hopper the result is an erratic movement of the weigher itself and a sluggish action of one of the delivery operations and the weight of grain from one compartment cannot be identical with that of the other.

In the present instance since the grain is cast from a direction in line with the axis of the shaft C' the pressure of grain is no greater upon the valve in one position than in another; consequently all of the actions of the weigher are identical.

Attention is directed to the manner of connecting the lever $S^2$ to the arm V of the valve C. As shown, the valve in either of its positions lies at substantially the same angle to a vertical line passing through the shaft C', the arm V lying parallel to said valve. The upper arm of the lever $S^2$ is of such a length above its pivot, and has such a relation to the free end of the said arm V that, as shown in one set of broken lines, the link U slants upwardly to the said arm V. This is at the time the valve lies at the right as viewed in Fig. 2. In the opposite position of the valve, or when it is at the left, the arm of the lever occupies a vertical position, the said link U then slanting downwardly to the arm. The pivot T of the lever is so placed that the link U maintains practically the same relation to the arm V at all times which is found to be an important feature in the construction of the weigher. The relation of the parts is thus such that when the link in being pushed in the direction of its length upon the valve to move it to the left or when pulling it to the right the degree of power for the operation is the same at all times so as to in no way interfere with accurate weighing. This arrangement, therefore, does not affect the operation of the valves N, R, R' with which the lever S² is in operative engagement and which operates the said valve C. That is to say, by thus disposing the connections accuracy of weighing is assured from either compartment and this together with the other advantages described yields advantages not before attainable.

Having thus described my invention, I claim:—

1. A weighing hopper including in its construction a partition separating it into two compartments, a closure hingedly attached to the hopper at opposite outer walls of the said compartment, and an inner closure pivotally attached to said hopper beneath the partition, either of the outer closures adapted to close its respective compartment in conjunction with said inner closure.

2. A weighing hopper including in its construction, a partition dividing it into two compartments each open at its bottom, closures hinged parallel to one another, one at each of two outer walls, the axis of movement of each being parallel to the partition, and a closure pivoted beneath the partition parallel to it adapted to close either compartment in conjunction with one of the first named closures.

3. A weighing hopper including in its construction vertical sides and a partition separating it into two equal compartments, the partition and the outer walls of the compartments being substantially vertical throughout, mechanism adapted for closing the bottom of either compartment comprising a depending closure pivotally attached to the hopper beneath the partition, a closure suspended below each of the walls that lie opposite said partition, and a link connecting each second named closure with the first named part.

4. A weighing hopper including in its construction vertical sides and a partition dividing the hopper into two compartments of equal capacity, the partition and the outer walls being substantially vertical throughout, mechanism comprising a depending closure pivotally hung beneath the partition, a closure pivoted beneath each of the walls that lies parallel to the partition, a link connecting each of the last named closures with the first described closure, said first described part and one of the said last named ones adapted jointly to simultaneously close the bottom of one of said compartments, with the opening of the other compartment, those portions of the parts that serve to close the compartments when in their open positions lying substantially parallel to one another and substantially in the same plane as the respective walls beneath which they are suspended.

5. In a weigher, the combination of a hopper, and a counter-poise, an inclosed valve suspended above the hopper adapted to have two different positions, a conductor for delivering material upon the valve, the same lying parallel to the axis of said valve, a partition in said hopper substantially parallel to the axis of movement of the valve dividing the hopper into two compartments, mechanism comprising a closure pivoted beneath the partition, and an outer closure pivoted beneath each wall of the hopper that lies parallel to the partition, a link connecting each of the last named closures with the first, latch mechanism for operatively engaging and holding the closures in either of their extreme positions including a connection limited in its movement in one of the movements of the latch mechanism, and operating mechanism connecting the mechanism and the valve.

6. In a gravity weigher, the combination of a support, a hopper suspended therefrom including a counter-poise, a pair of closures pivotally suspended from the hopper and a third closure suspended between them, one of the pairs of closures and the third one arranged to move in the direction of one another and close the bottom of one of the compartments of the hopper, the other of the pairs and said third closure simultaneously opening the other compartment, a member directly connecting all of the closures for causing their simultaneous action, and latch mechanism for operatively engaging and holding the closures adapted to release them in the gravity movement of said hopper.

7. In a gravity weigher, the combination of a support, a hopper suspended therefrom including a partition dividing it into two compartments, a pair of closures pivotally suspended from the hopper, each below a compartment, a closure to act jointly with either of said pairs of closures, members directly connecting the closures, and latch mechanism operatively engaging the closures for automatically securing the same in their closed positions including a part suspended from the support adapted in the gravity movement of the hopper to actuate the said mechanism to release said closures.

8. In a gravity weigher, the combination of a support, a hopper, closures pivotally hung from the bottom of the hopper adapted to be opened by the weight of grain thereon, an arm pivotally hung from the hopper adapted to be swung by one of the closures and arranged for a limited swinging motion relatively thereto, means to limit the said relative swinging motion of said arm, and means to move the arm upon its pivot.

9. In a gravity weigher, the combination of a support, a hopper suspended therefrom, a closure pivoted at the bottom of the hopper adapted to be opened by the weight of grain thereon, an arm pivotally hung from the hopper adapted to swing with the closure and also arranged to have a limited swinging motion relatively to said closure, and an elastic member fixed at one end and attached at its other end to the arm and constantly tending to move the latter about its point of support.

10. In a gravity weigher, the combination of a support, a hopper, a closure pivoted at the bottom of the hopper suspended therefrom adapted to be opened by the weight of grain thereon, an arm pivotally hung from the hopper adapted to swing with the closure and also having a limited swinging movement relatively to said closure, means to limit said relative movement, latch mechanism to engage the arm and through it hold the closure in its closed position, and means constantly tending to swing the arm upon its point of support.

11. A weighing hopper including in its construction a partition dividing it into two compartments, each having a wide open bottom, the lower edges of the two outer opposite walls of the said compartments lying perpendicular to the partition being inclined downwardly toward the said partition, and also being inclined downwardly from the partition meeting the first described slanted edges and terminating in depending pointed extensions substantially midway between the plane of the partition and the wall that lies parallel thereto, a closure hinged beneath each of the last mentioned walls and adapted to lie upon the inclined edges first described, and a closure pivoted below the partition adapted to lie upon the second described inclined edges of either compartment, either of the first named closures adapted to close its respective compartment together with the second named closure.

12. A rectangular hopper including in its construction a central partition dividing it into two compartments, each wall of the hopper that lies at right angles to the said partition terminating below the partition in a V-shaped extension at each side of the latter creating an A-shaped recess directly beneath the partition, a hinged closure suspended beneath the walls that lie parallel to the partition to lie upon edges of the walls outward from the recess, and a closure pivoted beneath the partition in the angle of the recess adapted to close a given compartment in conjunction with the closure corresponding to such compartment.

13. A weighing hopper including a partition dividing it into two compartments, a closure hingedly attached at the outer wall of each said compartment, a closure pivoted below the partition adapted together with either of the first named closures to close a compartment, and a member connecting each of the said first named closures with the second named one.

14. In combination, a weighing hopper having a partition dividing it into two compartments, a closure hingedly attached at the outer wall of each said compartment adapted in its closing action to move toward the partition, a closure pivoted below the partition adapted together with either of the other closures to close one of the said compartments, and mechanism connecting the several closures to operate all of them simultaneously to open one compartment and close the other.

15. In combination, a weighing hopper having a partition dividing it into two compartments, a closure hingedly attached at the outer wall of each compartment, a closure pivoted between the closures thus disposed adapted to swing toward either of the same and in conjunction therewith close the bottom of one of the compartments, mechanism connecting the closures, and means operatively engaging the closures to hold them in either extreme position.

16. In combination, a weigher hopper having a partition dividing it into two compartments, a closure hinged at the outer wall thus disposed, a closure pivoted between the closures of each compartment and adapted to swing toward either of the same and in conjunction therewith close the bottom of one of the compartments, mechanism connecting the closures including a pair of divergent arms extending from the middle closure, a link connecting each arm with one of the first named closures, and means to operatively engage and hold the closures in either of their extreme positions.

17. The combination of a pivotally suspended gravity operated hopper including a dividing partition creating two compartments, and a poise, of a valve hinged at the outer wall of each said compartment, a centrally disposed pivoted valve for closing the bottom of a given compartment in conjunction with the outer valve corresponding to that compartment, the central valve having a pair of upwardly extending divergent arms, a link connecting each with one of the outer closures, and latch mechanism adapted to operatively engage the closures in either of the closed positions thereof, said latch mechanism including a part fixed in a stationary position adapted to cause the release of said closures when the hopper descends upon receiving its predetermined weight of grain.

18. The combination in a weighing hopper, of a closure suspended from the bottom of said hopper, an arm pivoted relatively to said closure, a contractile spring at one end operatively engaging the arm and fixed at its other end, the pivot of the arm lying between the ends of the said spring, a latch to engage and hold the arm, and a pair of spaced stops on the closure, one lying at each side of the arm.

19. The combination in a weighing hopper having a partition dividing it into two compartments of equal capacity, of a pivotally suspended closure beneath the partition, a closure pivoted beneath each outer wall, the pivot of each last named closure lying parallel to the pivot of the first named one, a member connecting each of said last named closures with the first, an arm pivoted relatively to said first named closure, the pivots of both the arm and the closure being substantially coincident, a spring at one end operatively engaging the arm and fixed in position at its other end, the pivot of the arm and the closure lying between the ends of the spring, a latch to engage and hold the arm, and a pair of spaced stops on the closure, there being one at each side of the arm.

20. The combination in a weighing hopper, of a pivotally suspended closure at the bottom of said hopper, an arm pivoted relatively to said closure, the pivots of both being substantially coincident, a spring at one end operatively engaging the arm, and fixed in position at its other end, the pivot of the arm lying between the ends of the spring.

21. In a weigher, the combination with support and a pivotally suspended hopper including a dividing partition creating two compartments, and a poise, of a valve hinged at the outer wall of each said compartment, a centrally disposed pivoted valve for closing the bottom of a given compartment in conjunction with the outer closure corresponding to that compartment, the central closure having a pair of upwardly extending divergent arms, the arms being equally spaced from a line extending through the center of the valve and its pivot, a link connecting each arm with one of the outer closures, latch mechanism including a part fixed on the support, to operatively and automatically engage the closures in either of their closed positions and adapted to automatically disengage from the same in the descent of the hopper, a valve to direct the grain into either compartment of the hopper, and an operating mechanism connecting the valve and the said central closure.

22. In a weigher, the combination of a hopper having a dividing partition separating it into two compartments, both the latter being open their full area at their bottoms, two opposite walls of each compartment having depending V-shaped extensions creating an A-shaped recess between them beneath the partition, a closure hingedly attached to the outer wall of each compartment parallel to the partition, an A-shaped closure pivoted in the described recess adapted to swing to either of two positions therein, and mechanism connecting the closures arranged to operate either of the outer closures and the closure in the recess to close one of the compartments and open the other.

23. In a gravity weigher, the combination of a hopper having a dividing partition separating it into two compartments, both the latter being open at their bottoms their full area, two opposite walls of each compartment having depending V-shaped extensions creating an A-shaped recess between them beneath the partition, a closure hingedly attached to the outer wall of each compartment parallel to the partition, an A-shaped closure pivoted in the described recess and adapted to be swung by weight of grain to either of two positions therein, mechanism connecting the closures arranged whereby one of the outer closures and the closure in the recess are adapted to close one of the compartments and open the other, a latch to operatively engage and hold the closures in either of their extreme positions, and means to assist the swinging movement of the closures.

24. A weigher including in its construction, a balanced hopper, a closure pivotally suspended therefrom, a spring at one end operatively engaging the closure and attached at its other end to a stationary support, the points of connection of the spring being at opposite sides of the pivot of the closure, and a part to adjust the spring at its supported end in a direction at perpendicular to the axis of movement of said closure.

25. A weighing hopper having an open bottom and including in its construction two spaced opposite walls having depending extensions oppositely beveled and each terminating substantially in a point, a closure attached to each of two other of its opposite walls adapted to move in the direction of one another and to close upon the said extension, the closures having flanges to overlie the outer sides of the extensions, one of said closures having a flange to overlie one of the edges of the other.

In testimony whereof I affix my signature, in presence of two witnesses.

EDWUARD WIEDINGER.

Witnesses:
W. I. SLEMMONS,
L. M. THURLOW.

Copies of this patent may be obtained for five cents each, by addressing the "Commissioner of Patents, Washington, D. C."